United States Patent

Ratigan et al.

[11] 4,237,008
[45] Dec. 2, 1980

[54] GRAVITY FLOW DISINFECTION CONTACTOR

[75] Inventors: Brian Ratigan, Philadelphia, Pa.; Karl E. Longley, San Antonio, Tex.; Robert N. Roop, Buckingham, Pa.

[73] Assignee: Fischer & Porter Co., Warminster, Pa.

[21] Appl. No.: 2,769

[22] Filed: Jan. 11, 1979

[51] Int. Cl.³ .................. C02B 1/18; C02B 1/36
[52] U.S. Cl. .................. 210/205; 210/220; 422/37
[58] Field of Search ............. 55/17, 84, 220, 256; 210/59-64, 169, 198 R, 199, 205, 209, 220; 422/28, 29, 37; 261/117, 118

[56] References Cited

U.S. PATENT DOCUMENTS

| | | | |
|---|---|---|---|
| 2,058,309 | 10/1936 | Haering | 210/198 R X |
| 3,649,493 | 3/1972 | Meiners et al. | 210/62 X |
| 3,936,382 | 2/1976 | White | 210/198 R |
| 4,076,617 | 2/1978 | Bybel et al. | 261/124 X |
| 4,138,217 | 2/1979 | Slagel et al. | 261/118 X |

Primary Examiner—Charles N. Hart
Assistant Examiner—Richard W. Burks
Attorney, Agent, or Firm—Michael Ebert

[57] ABSTRACT

A gravity flow disinfectant contactor adapted to enhance contact between a disinfectant solution such as chlorine and the water to be treated to effect a more rapid and efficient disinfection activity. The contactor is constituted by a rectangular conduit having a cross-sectional diffusion plane adjacent its inlet within which is an array of evenly-spaced diffuser tubes supplied with the disinfectant solution. The tubes each have a row of equi-spaced holes drilled diametrically therethrough to produce side-by-side opposing jets of disinfectant in the diffusion plane at right angles to the cross-flowing water stream. As a consequence, the water flowing through the conduit is subjected to a dense cross fire of multiple jets of disinfectant that are uniformly distributed throughout the diffusion plane and quickly interact with the water within a relatively short downstream distance.

4 Claims, 5 Drawing Figures

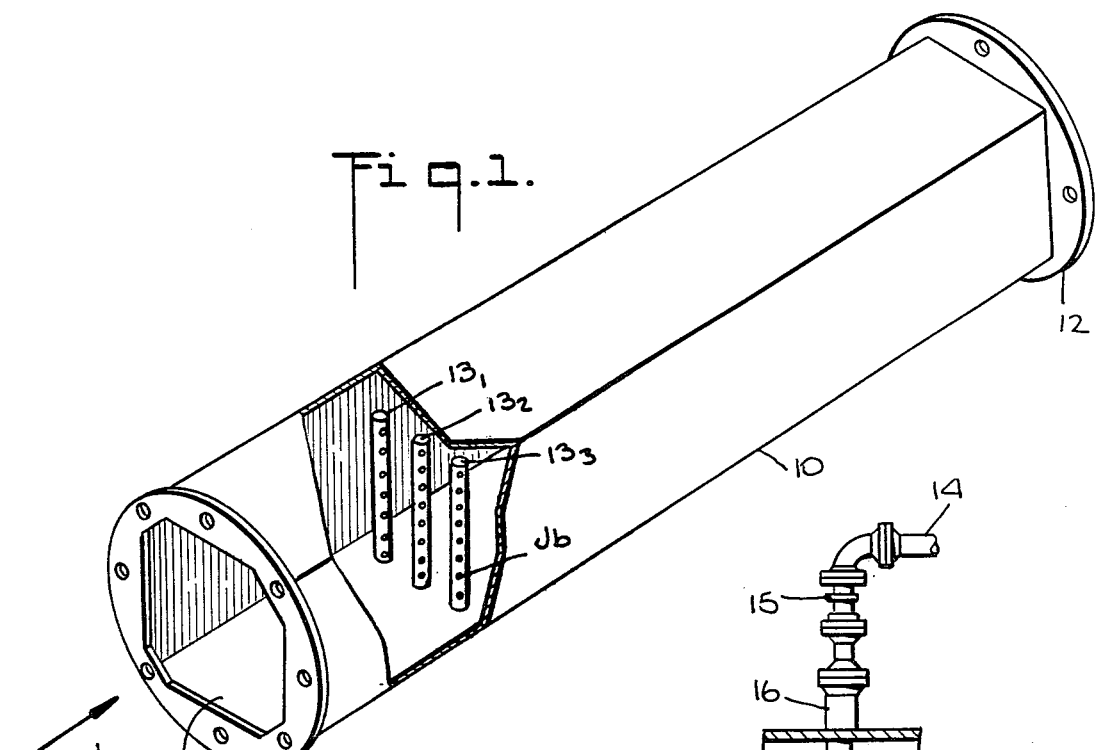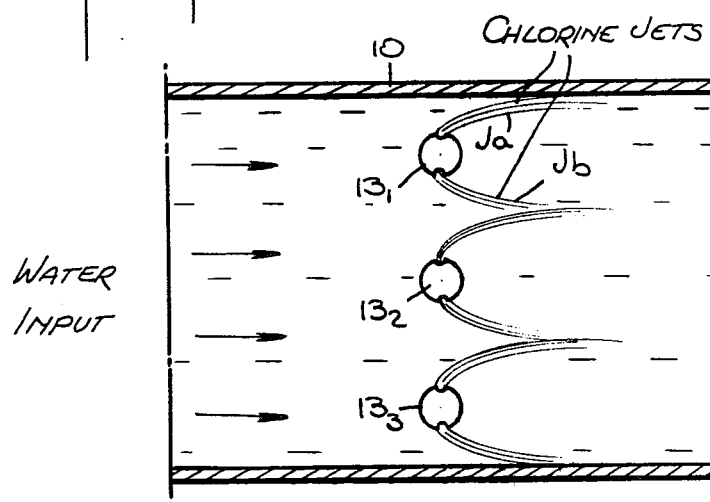

GRAVITY FLOW DISINFECTION CONTACTOR

BACKGROUND OF INVENTION

This invention relates generally to techniques for intermingling a disinfectant with wastewater to be treated to kill pathogens therein, and more particularly to a gravity flow disinfectant contactor having minimal energy requirements adapted to enhance contact between the disinfectant and the water to effect a rapid and efficient disinfection activity.

Chlorination is widely used to purify water supplies. In practice, chlorine is introduced at a selected point in the water supply system, flow then taking place into a tank or through a region of flow which is sufficient for the chlorine to act effectively on the contaminants present in the water to produce a disinfecting action. The amount of chlorine added to the water is referred to as the "dosage", and is usually expressed as milligrams per liter (mg/l) or parts per million (ppm). The amount of chlorine used up or consumed by bacteria, algae, organic compounds and some inorganic substances, such as iron or manganese, is designated as the "demand."

Since many of the reactions with chlorine are not instantaneous, but require time to reach completion, chlorine demand is time-dependent. The amount of chlorine remaining in the water at the time of mesurement is referred to as the "residual." Residual is therefore determined by the demand substracted from the dosage. Inasmuch chlorine demand is time-dependent, this dependency is likewise true of chlorine residual.

When chlorine dissolves in water, a mixture of hypochlorous and hydrochloric acids is formed. The hydrochloric acid always completely dissociates into hydrogen and chloride ions, whereas the hypochlorous acid only partially dissociates into hydrogen and hypochlorite ions as a function of the pH of the water. In either the hypochlorous or hypochlorite form, chlorine is called "free chlorine residual." Free chlorine residual has a highly effective killing power toward bacteria.

Should the chlorinated water contain ammonia or certain amino (nitrogen-based) compounds, as is invariably the case with sewage, then additional compounds, called chloramines, are created. Chloramines may occur almost instanteously, depending mainly on water pH. Though several reactions are possible between hypochlorous acid and ammonia, chloramines collectively are referred to as "combined chlorine residual." This combined chlorine residual has a much lower bactericidal effect than free chlorine residual.

Domestic wastewater is typically high in ammonia, the ammonia resulting primarily from hydrolysis of urea. Almost all of the inorganic nitrogen formed in solutions that enter a waste treatment plant is normally in the least oxidized, ammonia form. In conventional secondary waste treatment, a portion of the ammonia will be completely nitrified to nitrite, some ammonia will be only partially nitrified to nitrite, and a portion will remain as ammonia.

When sufficiently high chlorine dosages are applied to waters containing ammonia, different reactions will occur, resulting in the destruction of the ammonia and the formation of free chlorine residual. Thus, for water containing a known amount of ammonia, if one starts with a chlorine dosage which is low, chloramines will be formed resulting in a combined chlorine residual whose bactericidal effect is relatively weak.

As the dosage is raised, the amount of combined chlorine residual produced also increases, until a peak is reached when all of the free ammonia is used up in the formation of chloramine. And as the dosage is elevated beyond the level at which the combined chlorine residual peaks, destruction of the chloramines, which are unstable, takes place until a breakpoint is reached indicating that chloramine destruction is at its maximum. At breakpoint, the first persistent appearance of free chlorine occurs. Thus by using a chlorine dosage sufficient to attain the breakpoint state, one is able to get rid of virtually all ammonia and most of the chloramines.

The virtues of chlorination have long been appreciated, but it is only recently that the hazards involved in excessive chlorination have been publicly recognized. In studies carried out in the chlorinated water supply of the City of New Orleans, it was found that the levels of chlorination were such as to release carcinogenic agents dangerous to the community. The results of this study are reported in the article by R. A. Harris, "The Implication of Cancer Causing Substances in Mississippi River Water," published by the Environmental Defense Fund, Washington, D.C., Nov. 6, 1974.

Shortly after this study appeared, Public Law 93-523 went into effect authorizing the ERA administrator to conduct a comprehensive study of public water supplies "to determine the nature, extent, sources of, and means of control of contamination by chemicals or other substances suspected of being carcinogens."

Subsequently, Jolley ("Chlorine-containing Organic Constituents in Chlorinated Effluents"—Journal of the Water Pollution Control Fed., 47:601—618 (1975) reported the presence of forty-four chloro-organic compounds in a chlorinated secondarywastewater effluent.

Many applications exist for chlorine in wastewater treatment facilities, such as for odor control of raw sewage and the control of hydrogen sulfide in sewers, but its most universal application lies in wastewater treatment facilities for the terminal disinfection of the treated plant effluent just before the effluent is discharged.

The formation of compounds suspected of being carcinogenic as a result of the reaction of chlorine with hydrocarbons in wastewater is by no means the only unwanted side effect caused by the traditional disinfection process, for chlorine residuals in wastewater give rise to an environment that is toxic to aquatic organisms. Though chlorine is a highly effective biocide for undersirable organisms, it is also deadly to fish and other forms of aquatic life and therefore has a deleterious impact on fresh water eco-systems.

In general, wastewater disinfection practice has heretofore largely disregarded these unwanted side effects, for this practice focused on the two factors thought to be of greatest significance in attaining adequate disinfection; namely, the residual of the disinfectant and its contact time with the sewage. This practice has brought about the use of massive doses of disinfectant in long serpentine channels serving to prolong contact time. While this produced the desired degree of disinfection, it also aggravated unwanted side effects.

In order to obtain adequate disinfection with minimal unwanted side effects, the now-recognized goal is to carry out rapid, intimate mixing of the chlorine solution with the wastewater stream in the shortest possible period.

Thus one of the most important facets of a good chlorinator installation is the chlorine solution diffuser which injects the chlorine into the pipe or channel carrying the potable water or wastewater to be disinfected. It has heretofore been the practice to introduce the chlorine solution into the central region of the pipe or channel, for it was believed that this would cause the chlorine to mix with the water in the shortest possible time.

In one prior diffuser system based on this approach, use is made of a small pipeline serving as a mixing device, the chlorine solution being injected through a tube extending to the centerline of the pipe to discharge the solution at right angle to the water flow direction. In this prior arrangement, the water stream flowing through the pipe deflects the chlorine injected therein to cause it to intermingle downstream with the water to produce the necessary mixing action.

In another known diffuser installation designed for larger closed conduits, an array of radially-arranged injector tubes is provided to introduce chlorine solutions into the central region of the conduit, again at right angles to the direction of water flow. For large open channels, it is known to support a chlorine solution manifold line above the channel. Injection tubes are suspended from this manifold line and extend into the channel for injecting the disinfectant into the channel at the central region therein.

In still another known arrangement designed for pipes larger than 36 inches in diameter, a diffuser tube having a series of jet apertures therein is supported centrally across the pipe along a diametrical axis to produce a row of jets above and below the tube at right angles to the water flow.

The difficulty with the above-described prior diffuser arrangements is that the chlorine solution in all instances is discharged into the flowing water at the central zone of the pipe or channel so that the disinfectant discharge takes place within a confined region. In order to effect thorough mixing of the chlorine solution with the water being treated, it is essential that the chlorine be dispersed throughout the body of the water. With prior arrangements such disposal does not occur at the point of injection but much further downstream in the pipe or channel, as a consequence of which, the mixing action fails to take place in the shortest possible time.

Ideally, the mixing time for the chlorine solution should be a fraction of a second. With a view to overcoming the limitations of conventional diffuser arrangements, a jet disinfection technique has been developed to accelerate the mixing activity. This technique is described in the *Penberthy Jet Disinfection Technical Bulletin* published in 1977 by the Pentech Division of Houdaille Industries, Inc. of Cedar Falls, Iowa, U.S. Pat. No. 4,019,983)

In this jet disinfection technique, the influent to be treated is pumped into a jet nozzle to which a chlorine supply is coupled, the nozzle projecting the influent into a reactor tube into which the chlorine is drawn by induced vacuum. Because of the highly turbulent field existing within the reaction tube, the disinfectant is thoroughly dispersed throughout the entire effluent flow and for an instant subjects the bacteria and viruses to an acutely toxic environment.

In a typical jet disinfection installation, a sealed baffle is placed across the wastewater channel to direct all channel flow through a plurality of reactor tubes. A portion of the incoming wastewater flow is internally pumped into the jet nozzle associated with each reactor tube, the chlorine being carried into the jet by induced vacuum. Thus, in addition to the external pump requirements for the channel, each jet nozzle assembly requires its own internal pump, thereby adding substantially to the overall cost of installing and operating the system, particularly with respect to power consumption.

SUMMARY OF INVENTION

In view of the foregoing it is the main object of this invention to provide a gravity flow disinfection contactor which effects thorough dispersion of the disinfectant in the water to be treated in the shortest possible time.

More particularly, an object of this invention is to provide a contactor of the above-type which introduces multiple jets of disinfectant solution such as chlorine or chlorine dioxide into an aqueous steam, the jets being so distributed as to broadly disperse the solution in the water at its point of introduction whereby the interaction of the solution with the water occurs in a relatively short period.

A significant advantage of a contactor in accordance with the invention is that it carries out the destruction of bacterial and viral pathogens quickly and efficiently and yet consumes significantly less energy than the jet disinfection technique.

Also an object of the invention is to provide a contactor whose basic diffuser components lend themselves to standardization, whereby the contactor may readily be scaled up to accommodate any desired flow area.

Briefly stated, a gravity flow disinfection contactor in accordance with the invention is constituted by a rectangular conduit having a cross sectional diffuser plane adjacent its inlet. Supported in the diffuser plane is an array of evenly-spaced diffuser tubes having a row of equi-spaced holes drilled diametrically therethrough to produce side-by-side opposing jets of disinfectant in the plane at right angles to the cross-flowing water stream whereby the water flowing through the conduit is subjected in the diffuser plane to a dense cross-fire of multiple jets that are uniformly distributed and interact with the water within a relatively short downstream distance.

OUTLINE OF THE DRAWINGS

For a better understanding of the invention as well as other objects and further features thereof, reference is made to the following detailed description to be read in conjunction with the accompanying drawings, wherein:

FIG. 1 shows a contactor provided with a rectangular conduit having an array of diffuser tubes therein in accordance with the invention;

FIG. 2 is a transverse section taken through the diffuser plane of the contactor, showing one of the diffuser tubes;

FIG. 3 illustrates in plan view the flow pattern of jets in the conduit resulting from the impingement thereon of the water stream;

DESCRIPTION OF INVENTION

Principles of Invention

Figure 4:
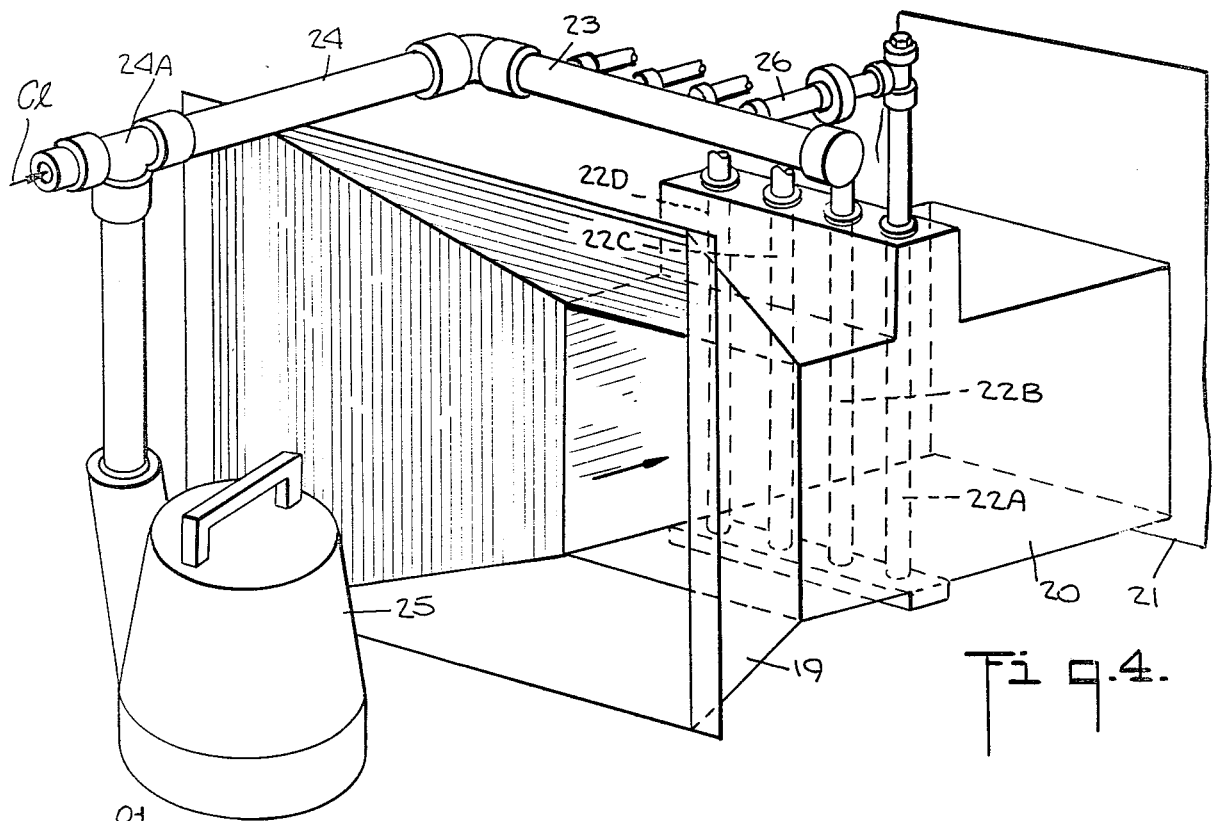
FIG. 4 is a perspective view of a working installation.

Referring now to FIG. 1, there is shown a gravity flow disinfectant contactor in accordance with the invention for injecting a solution of disinfectant such as chlorine or chlorine dioxide into an aqueous stream.

The contactor includes a conduit 10 having a rectangular cross-section and provided with mounting flanges 11 and 12 for interposing the contactor in a wastewater line or for otherwise installing the conduit. Conduit 10 may, in practice, be fabricated of fiberglass or other suitable material and be situated vertically in a contact tank or horizontally in a flow channel.

Mounted in a cross-sectional diffusion plane adjacent the inlet end 10A of the conduit is an array of evenly-spaced diffuser tubes $13_1$, $13_2$ and $13_3$, each of which extends across the conduit to bridge the side walls thereof. As shown in FIG. 2, each diffuser tube is supplied with the disinfectant solution through a supply pipe 14 coupled to one end of the tube through a flexible or rigid connection 15 of Teflon or rubber. The tube is inserted in the conduit through lateral insert sleeve 16, the other end of the tube being socketed in a diametrically-opposed sleeve 17 having a blind flange 18. Thus each tube may be readily withdrawn from the conduit for cleaning or maintenance.

Each tube is formed of standard pipe made of stainless steel or other suitable non-reactive material, such as PVC. The tube has a single row of orifices drilled diametrically therethrough to create a row of jet openings Ja on one side and a corresponding row of jet openings Jb on the opposing side of the tube. The spacing between adjacent orifices along the tube is equal to about three orifice diameters.

The orifice diameters are made as small as is practical without plugging. Thus a diameter of about 3/16 inch is acceptable. The diameter of tubes $13_1$, $13_2$ and $13_3$ is large enough to ensure even jet flow along the length taken. The diffuser tubes are oriented so that the disinfectant jets Ja and Jb are emitted in a direction perpendicular to the flow of the aqueous stream through the conduit. The spacing between the diffuser tubes is about ten times the orifice diameter.

In practice, the velocity of the jets should be at least 2.5 times the velocity of the cross-flowing aqueous stream. The Reynolds number of the jets should be greater than 5,000 to ensure turbulent flow. To achieve these cnditions, additional water must be used with the disinfectant stream or a large ejector.

As shown in FIG. 3, the jets emitted perpendicularly from the tubes in the side-by-side opposing directions in the diffusion cross-sectional plane of the conduit are uniformly distributed throughout this plane to create a dense cross-fire that is intercepted by the incoming stream of water to be treated with the disinfectant. Thus what the water sees in approaching the diffuser zone is not one or more disinfection jets only in the central region of the conduit, as in prior contactors, but a curtain of jets which covers the full cross-sectional plane. This jet cross fire, as illustrated in FIG. 3, is deflected downstream by the crossflowing aqueous stream. But because of the broad dispersion of the jets in the diffusion plane, the interaction between the disinfectant and the water occurs very quickly in a short downstream distance from the diffusion plane.

By pre-mixing the disinfectant stream with a portion of the water to be treated, the disinfectant/water stream ratio can be maintained essentially constant. The diffuser tube hole size diameter and spacing may be standardized; hence to accommodate a desired flow area, only the length and number of tubes need be varied. Thus while a three tube diffuser array may be designed for operation in a one-million-gallon-per-day (IMGD) plant, a larger number of such tubes in longer lengths may be provided in sealing up the design for, say, a 100 MGD plant.

ACTUAL EMBODIMENT

Referring now to FIG. 4, there is shown an actual embodiment of the invention in which wastewater fed into the converging section 19 of a conduit flows into a contactor section 20 whose output passes through a baffle 21.

Contactor section 20 is provided with an array of vertically-mounted diffuser tubes 22A, 22B, 22C and 22D having opposing jet openings in accordance with the invention. Each tube is supplied with a disinfectant solution through a manifold 23 into which a disinfectant, such as chlorine, is fed through pipe 24 in which it is intermingled with wastewater forced into pipe 24 through junction 24A by means of a submerged pump 25. Manifold 23 is coupled to the diffuser tubes through respective pipes 26. Thus in the contactor, the incoming stream of wastewater passes through a dense cross-fire of disinfectant to provide a rapid and effective interaction.

TESTS

A one-million-gallon-per-day plant was tested at the Rilling Road Treatment Plant in San Antonio, Texas, whose wastewater was contacted with various doses of chlorine. Samples were taken initially and at intervals after passing through the contactor.

Figure 5:
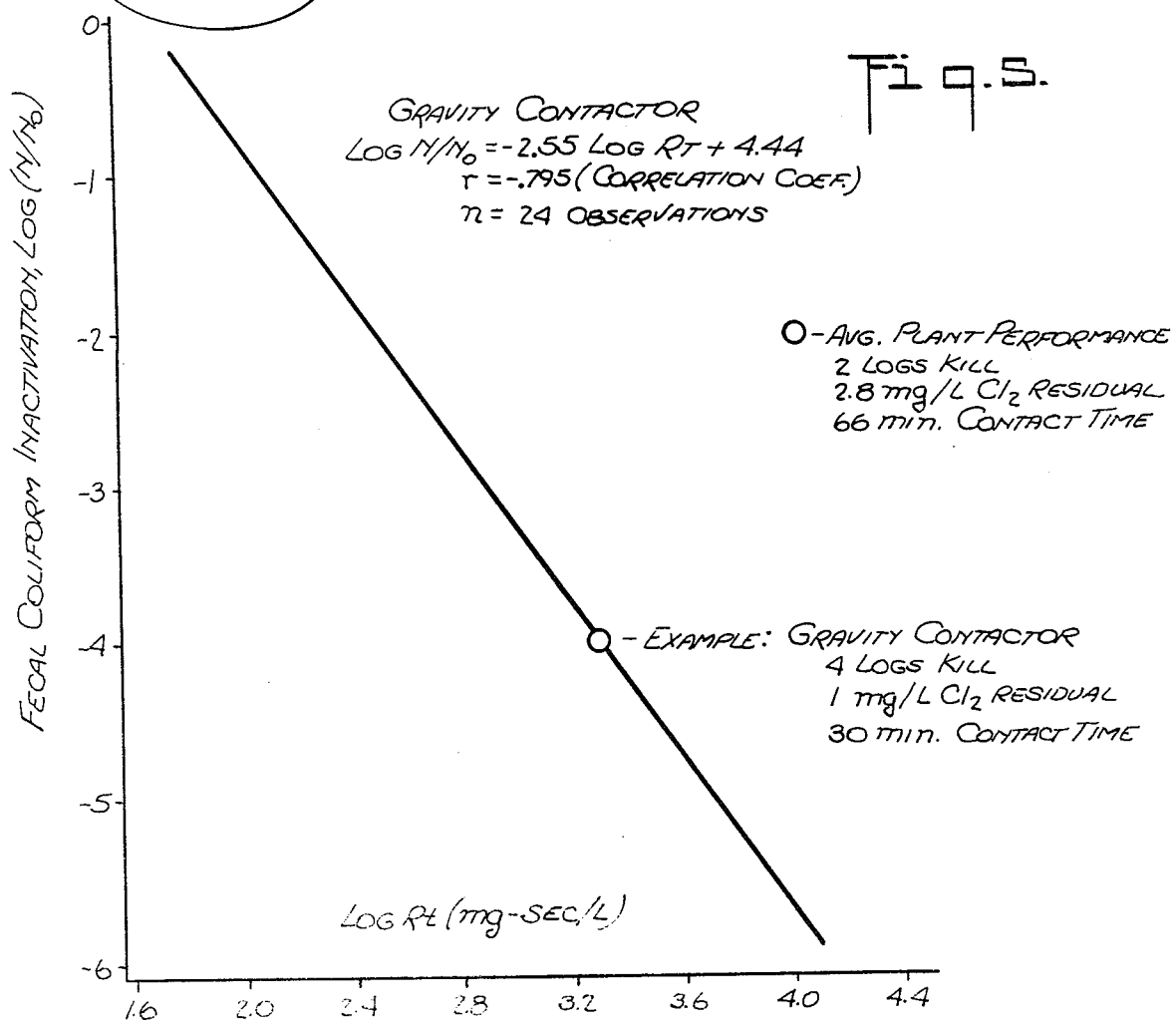
FIG. 5 is a graph explanatory of the advantages of the invention.

FIG. 5 shows a plot of the results, the fecal coliform inactivation log (N/No) being plotted against log chlorine residual times time after contacting (mg-sec/L).

Typical plant performance is also shown. It was found in these tests that the contactor achieved far better disinfection using less chlorine and requiring less contact time, than did the same plant using a conventional open-channel arrangement.

While there has been shown and described a preferred embodiment of a gravity flow disinfection contactor in accordance with the invention, it will be appreciated that many changes and modifications may be made therein without, however, departing from the essential spirit of the invention.

We claim:
1. A gravity flow disinfection contactor comprising:
   A. a conduit for conducting a water stream to be treated along the axis of the conduit, said conduit having a rectangular cross section and a cross-sectional diffusion plane adjacent the inlet thereto; and
   B. an array of at least three diffusion tubes disposed at evenly-spaced positions within said plane across said conduit to bridge the side walls thereof, said tubes each having a row of equi-spaced orifices drilled therethrough to define diametrically opposed jet openings to produce jet emissions in opposing directions at right angles to the conduit axis, said orifices having a relatively small diameter, the spacing between said orifices in each row thereof being equal to about three time the orifice diameter, the spacing between the tubes in said array being equal to about ten times the opening diameter; and
   C. means to supply a disinfectant solution to said tubes to create a dense cross fire of disinfectant jets dispersed throughout said plane, said jets being intercepted and deflected by the cross flowing water stream passing through said conduit to quickly interact therewith, the Reynolds number of the jets being greater than 5,000 to ensure turbulence, the velocity of the jets being at least twice the velocity of the cross flowing water stream.

2. A contactor as set forth in claim 1, wherein said conduit is formed of fiberglass.

3. A contactor as set forth in claim 1, wherein said solution is chlorine solution.

4. A contactor as set forth in claim 1, wherein said solution is a chlorine dioxide solution.

* * * * *

UNITED STATES PATENT OFFICE
CERTIFICATE OF CORRECTION

Patent No. 4,237,008            Dated December 2, 1980

Inventor(s) Brian Ratigan, Karl E. Longley, Robert N. Roop

It is certified that error appears in the above-identified patent and that said Letters Patent are hereby corrected as shown below:

Column 2, line 25 "ERA" should read -- EPA --

Column 2, line 34, "secondarywastewater" should read -- secondary wastewater --

Column 2, line 48 "under-" should read -- unde- --

Column 4, line 15 "steam" should read -- stream --

Column 5, line 42 "cnditions" should read -- conditions --

Column 6, line 59 "time" should read -- times --

Signed and Sealed this

First Day of September 1981

[SEAL]

Attest:

GERALD J. MOSSINGHOFF

Attesting Officer      Commissioner of Patents and Trademarks